United States Patent [19]
Kelly

[11] Patent Number: 5,337,181
[45] Date of Patent: Aug. 9, 1994

[54] OPTICAL SPATIAL FILTER

[76] Inventor: Shawn L. Kelly, 6423 Hollyhock Trail, Brighton, Mich. 48116

[21] Appl. No.: 936,755

[22] Filed: Aug. 27, 1992

[51] Int. Cl.$^5$ .......... G02B 5/04; G02B 27/46; H04N 5/72
[52] U.S. Cl. .......... 359/574; 359/569; 359/837
[58] Field of Search .......... 359/837, 831, 559, 560, 359/561, 566, 569, 572, 742, 574

[56] References Cited

U.S. PATENT DOCUMENTS

| | | | |
|---|---|---|---|
| 2,154,360 | 4/1939 | Scheel et al. | 359/547 |
| 3,681,519 | 8/1972 | Larsen et al. | 358/47 |
| 3,756,695 | 9/1973 | Mino et al. | 359/576 |
| 3,768,888 | 10/1973 | Nishino et al. | 359/576 |
| 3,781,091 | 12/1973 | Ferguson | 359/831 |
| 3,821,795 | 6/1974 | Okano | 358/47 |
| 3,851,947 | 12/1974 | Montgomery | 359/527 |
| 3,911,479 | 10/1975 | Sakurai | 358/44 |
| 4,477,148 | 10/1984 | Tsuji et al. | 359/837 |
| 4,795,236 | 1/1989 | Ise | 359/569 |
| 5,005,968 | 4/1991 | Tejima et al. | 353/122 |
| 5,012,274 | 4/1991 | Delgoff | 340/702 |
| 5,142,413 | 8/1992 | Kelly | 359/559 |

FOREIGN PATENT DOCUMENTS

| | | | |
|---|---|---|---|
| 55-38549 | 3/1980 | Japan | 359/837 |
| 63-287921 | 11/1988 | Japan | 359/831 |

Primary Examiner—Jon W. Henry
Attorney, Agent, or Firm—Lyman R. Lyon

[57] ABSTRACT

An optical filter 10 for filtering spatial frequencies from an output of an optical imaging system comprises a substantially transparent, or reflective, optical element 12 having a plurality of light refracting, or reflecting, segments 18 arranged on a surface thereof. Each of the plurality of segments 18 is provided with a predetermined angle of refraction, or reflection, distinct from adjacently located segments 18, wherein the different angles of refraction, or reflection, and the arrangement of the segments 18 on the optical element 12, are determined based on a desired spatial frequency transfer function for the filter 10. The optical spatial filter 10 reduces errors in optically formed images by accurately confining a broadened Point Spread Function (PSF) to a desired spot size.

1 Claim, 1 Drawing Sheet

OPTICAL SPATIAL FILTER

BACKGROUND OF THE INVENTION

The present invention relates generally to optical filters, and more particularly to an optical spatial filter for filtering spatial frequencies from an optically formed image.

Spatial filtering is routinely implemented in optical systems to decrease error in the corresponding image. Such error is primarily encountered in an image which has been sampled, resulting in a harmonic duplication of the original spectrum in the spatial frequency domain. Appropriate spatial filtering reduces this error. Optical spatial filtering is directly related to modifying the Point Spread Function (PSF) of the optical system. Therefore, modifying the PSF of an optical system by proper spatial filtering, can similarly reduce image error.

Historically, spatial filters were applied in the form of an opaque mask consisting of transparent or partially transparent apertures. However, such filters are limited in utility due to significant loss of light. In the last thirty years, transparent, phase-only spatial filters have been developed which do not suffer from this loss. These filters are generally comprised of a plurality of transparent subapertures on a transparent substrate wherein the relative thickness of subapertures is designed to adjust the phase composition of the light passing through the optical system. Such filters are generally impractical to fabricate, are quite sensitive to color variations and also produce a significant blurring of the image.

Other known optical low-pass filter arrangements have utilized a birefringent plate to refract the incident light into two almost overlapping images. However, birefringent plates are inherently very sensitive to polarization, wavelength variation and direction of the incident light. Also, birefringent plate filters have an attendant high cost due to the materials, e.g. quartz, used to construct the filter.

In U.S. Pat. No. 5,142,413, entitled "Optical Phase-Only Spatial Filter," incorporated by reference herein, a new type of transparent spatial filter is taught utilizing a plurality of subapertures which provide filtering by destroying spatial coherence. Such a forth is much more practical to fabricate than the previous forms and is much less sensitive to color. However, the above described filter still produces significant image blur due to the inherent filtering effect as well as to scattering by the filter structure. Further, the difficulties associated with the above forms of spatial filters restrict their optimum location in the optical system to regions significantly removed from the image plane, primarily due to increased scattering in the associated diffraction-based designs as the image plane is approached.

The most common use of a spatial filter is to broaden the PSF of an optical system—increasing the size of the smallest resolvable detail. Image blur is produced by current spatial filters because such spreading cannot be entirely confined to a desired spot size.

SUMMARY OF THE INVENTION

It is therefore an object of the invention to provide an improved optical filter.

It is a further object of the invention to provide an optical filter for reducing error in optically formed images.

It is another object of the invention to provide a filter for modifying the PSF, and therefore the spatial frequency transfer function, of an optical system without substantially reducing the transmittance of the system.

It is another object of the invention to provide an optical spatial filter which can be located near an image plane of an optical system.

The present invention eliminates or substantially reduces, in critical importance, problems with prior art filters as just described hereinabove by providing in a first embodiment an optical, refractive, spatial filter comprising an optical element consisting of a pattern of adjacent prism apertures each of which refract light by a variety of small, relative angles. The optical image formed by each aperture is therefore slightly displaced with respect to others to effectively spread the PSF. The size, shape and relative angle of each prism aperture, and the pattern which the apertures form on the element, are determined by the desired PSF, and similarly the desired spatial frequency transfer function, for a given imaging system. Because filtering in the refractive filter is produced by refraction instead of diffraction, the spreading of the PSF can be controlled to a much greater degree than that offered by prior methods. Further, since the relative angles among prism apertures are very small, and since the size of the apertures can be larger than the diffraction-based subapertures of previous filter forms, the scattering produced by the refractive transparent spatial filter is significantly lower. Thus, the filter of the present invention can be utilized in a much closer physical relationship with an image plane. Therefore, the invention has application to virtually all electronic imaging applications including, but not limited to, CCD cameras, projection displays and direct-view displays.

In accordance with the present invention, an optical spatial filter for filtering spatial frequencies from the output of an optical imaging system comprises an optical element having a plurality of transparent, or reflective in the case of a mirror, segments arranged in a predetermined pattern, each of the plurality of transparent or reflective segments deviating the light path direction at an angle generally different than that of other segments, wherein the design of each respective transparent or reflective segment, and the pattern in which the plurality of transparent or reflective segments are arranged, is based on a desired system spatial frequency transfer function.

The present invention will be more fully understood upon reading the following detailed description of the preferred embodiment in conjunction with the accompanying drawings.

DETAILED DESCRIPTION OF THE PREFERRED EMBODIMENTS OF THE INVENTION

Figure 1:
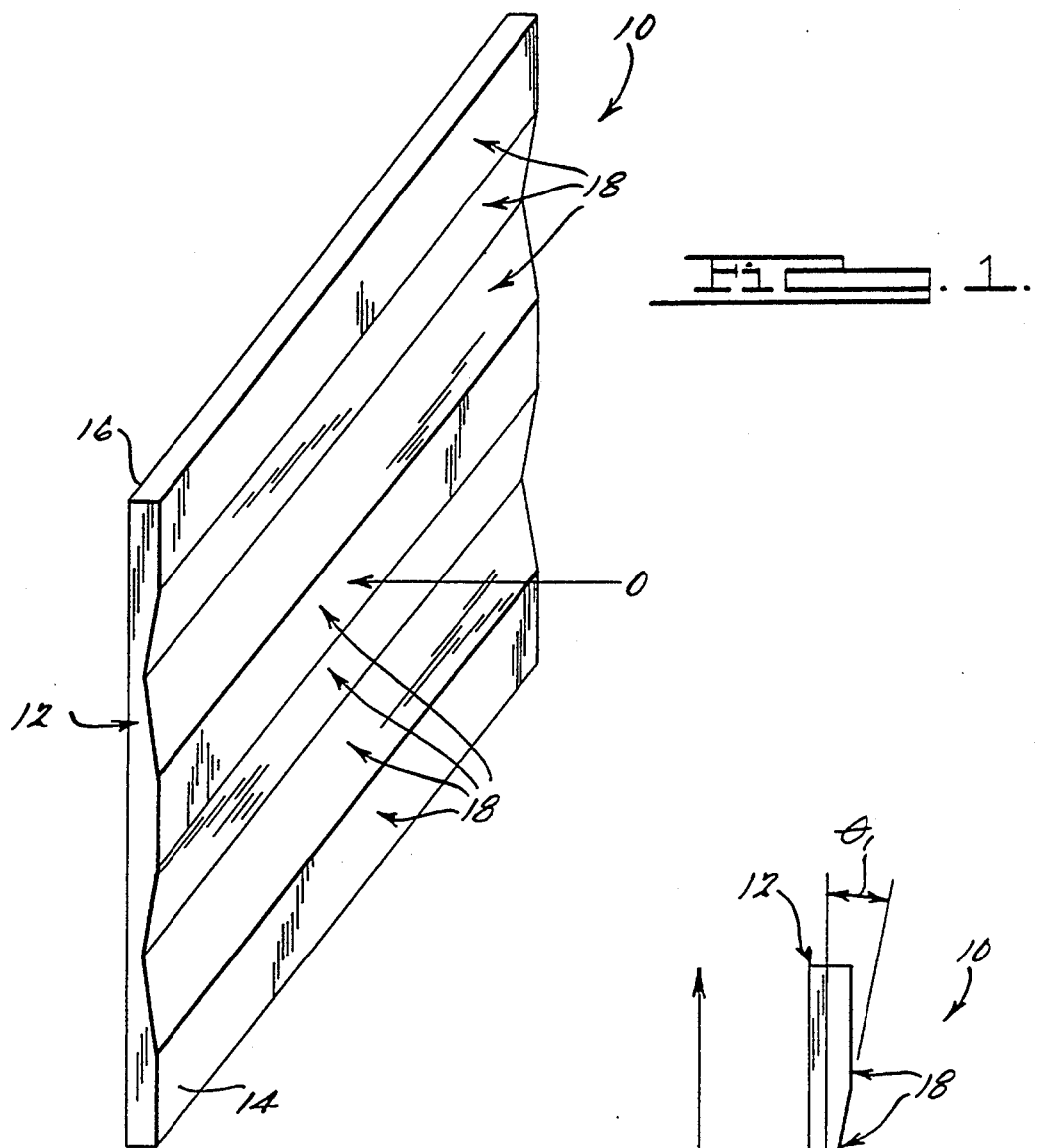
FIG. 1 shows a representative configuration of a optical spatial filter in accordance with the present invention.
Figure 2:
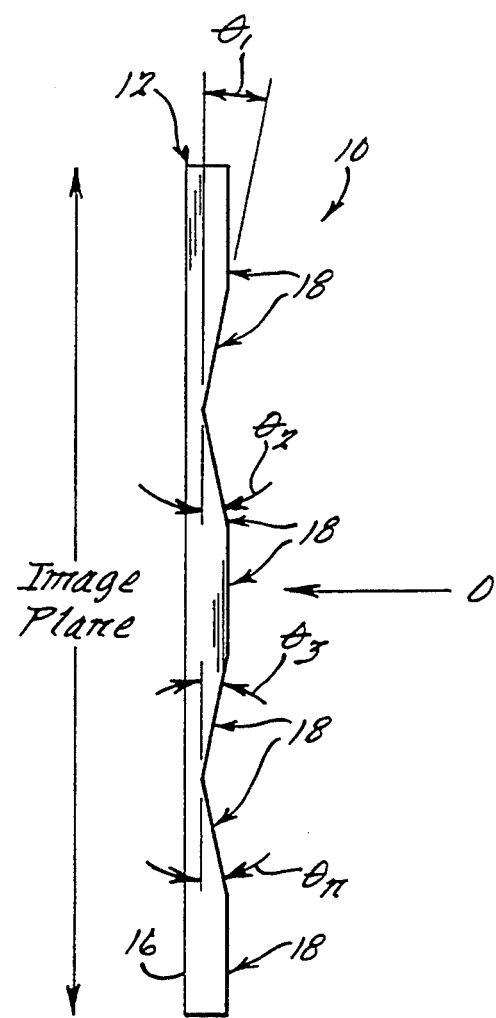
FIG. 2 shows a side view of the optical spatial filter of FIG. 1.

FIGS. 1 and 2 show a representative configuration of a filter 10 of the invention which provides spatial filtering in a single direction. Filter 10 comprises an optical element 12, such as a substantially transparent window, which is placed in an imaging system (not shown) disposed along an optical axis 0. The front surface 14 of optical element 12 is oriented relative to the flat rear surface 16 to form an array of light modifying segments 18, having any suitable shape such as the rectangular configuration shown in FIG. 1. In a first embodiment, the array of light modifying segments 18 are prismatic in nature. The surface of each prismatic segment 18 forms a predetermined angle $\theta$ relative to the flat rear surface 16 of filter 10. Thus, a series of prism angles $\theta_1$ to $\theta_n$, where n is equal to the number of prismatic segments 18, are formed along the front surface 14. The angles $\theta_1$ to $\theta_n$ of the segments 18, and the size of the segments 18, particularly relative to the image plane, are exaggerated in FIGS. 1 and 2 for clarity.

Optical element 12 and each prismatic segment 18 may comprise any suitable optical material such as glass or plastic. In an alternative embodiment, an optical material such as metal can also be employed when the present invention is utilized as a reflective filter. Filter 10 can be fabricated by any suitable process as would occur to one of ordinary skill guided by the teachings of the present invention to produce an array of segments 18 exhibiting the desired optical properties, i.e. refraction, or reflection, of light to produce image displacements without any diminishing of the light intensity. Accordingly, segments 18 may be deposited and/or fabricated and joined utilizing chemical or ion etching, mechanical ruling, chemical vapor deposition, replication or other suitable method, the same not being considered limiting of the invention. Further, segments 18 may be formed by variations in index of refraction of the material across the segment to produce the required refraction.

Operation of the refractive embodiment of the present invention is best explained by considering the total image as a superposition of the images produced by each segment 18. Consider a point source used to determine the PSF of a filtered optical system. Each segment will produce an image of the point source (the segment PSF) in the image plane, shown in FIG. 2. The nature of the PSF of each such image can be determined exactly from diffraction theory. However, since the prism angles $\theta_1$ to $\theta_n$ are kept small in the present invention, the PSF can be approximated as simply the diffraction pattern produced by an aperture of the size of the segment 18, shifted in the image plane by the refraction induced by that segment. The composite filtered system PSF is then generally determined by superimposing the shifted diffraction patterns of all such images. The spatial frequency transfer function of the filter system can then be determined by Fourier transform of the composite PSF. In accordance with the present invention, the prism angles for prismatic segments 18 are determined using a desired spatial frequency transfer function. The predetermined angles of refraction produced by the predetermined prism angles based on the desired filter transfer function advantageously provide accurate confinement of the broadened PSF to a desired spot size, thereby minimizing image blur by obviating overlap of adjacent filtered point sources.

While the operation of the invention has been described in context with prismatic segments 18 providing light refraction of the point source, the present invention operates in a similar manner if the segments 18 are provided with a reflective surface, such as used in a reflective filter. More particularly, each segment 18 in the reflective filter provides a predetermined angular reflection of the light in the image plane to accurately confine the broadened PSF to a desired spot size. The predetermined angles of reflection, like the angles of refraction, are based on the desired spatial frequency transfer function.

The invention therefore provides an optical, refractive or reflective, spatial filter for modifying the PSF of an optical system and therefore for filtering spatial frequencies from an image. The invention produces filtered images with less blur than previous forms and is practical to fabricate. Filter 10 represents one embodiment of the invention which is partially similar in form to a Fresnel lens. Other embodiments of the invention guided by these teachings may in general be partially similar to the other prior art forms in the classes of binary optics, diffractive optics, microlens arrays and lenticular arrays. While such partial similarities in form may exist, all such prior art neither contemplates nor teaches the use of such forms for use in spatial filtering as described by the teachings herein. It is therefore understood that modifications to the invention may be made as might occur to one having ordinary skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An optical fiber for filtering spatial frequencies from an output image of an optical imaging system, said filter comprising:

an optical element located in said optical imaging system comprised of a plurality of light refracting segments adjacently arranged in a predetermined pattern on a surface of said optical element, each of said plurality of light refracting segments having gradients of index of refraction to produce a deviation of light path direction in said optical imaging system at an angle different than adjacently located light refracting segments, wherein the predetermined pattern and the angle of deviation in light path direction of each said plurality of light refracting segments is based on a desired filtered spatial frequency transfer function of said optical imaging system to filter spatial frequencies from the output image.

* * * * *

UNITED STATES PATENT AND TRADEMARK OFFICE
CERTIFICATE OF CORRECTION

PATENT NO. : 5,337,181
DATED : August 9, 1994
INVENTOR(S) : Shawn L. Kelly

It is certified that error appears in the above-identified patent and that said Letters Patent is hereby corrected as shown below:

Col. 4, line 40, claim 1, delete "fiber" and insert --filter--.

Col. 1, line 46, delete "forth" and insert --form--.

Signed and Sealed this

Eleventh Day of October, 1994

Attest:

BRUCE LEHMAN

Attesting Officer

Commissioner of Patents and Trademarks